Figure 5:
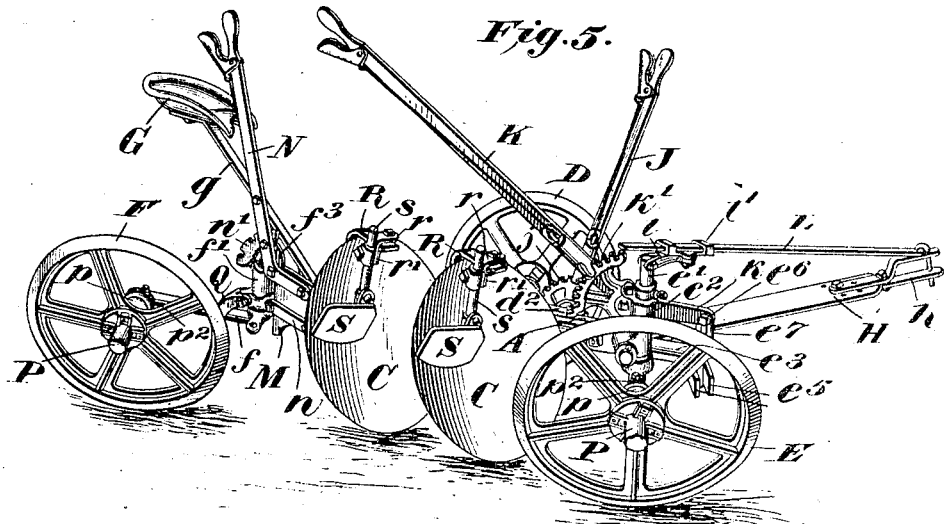

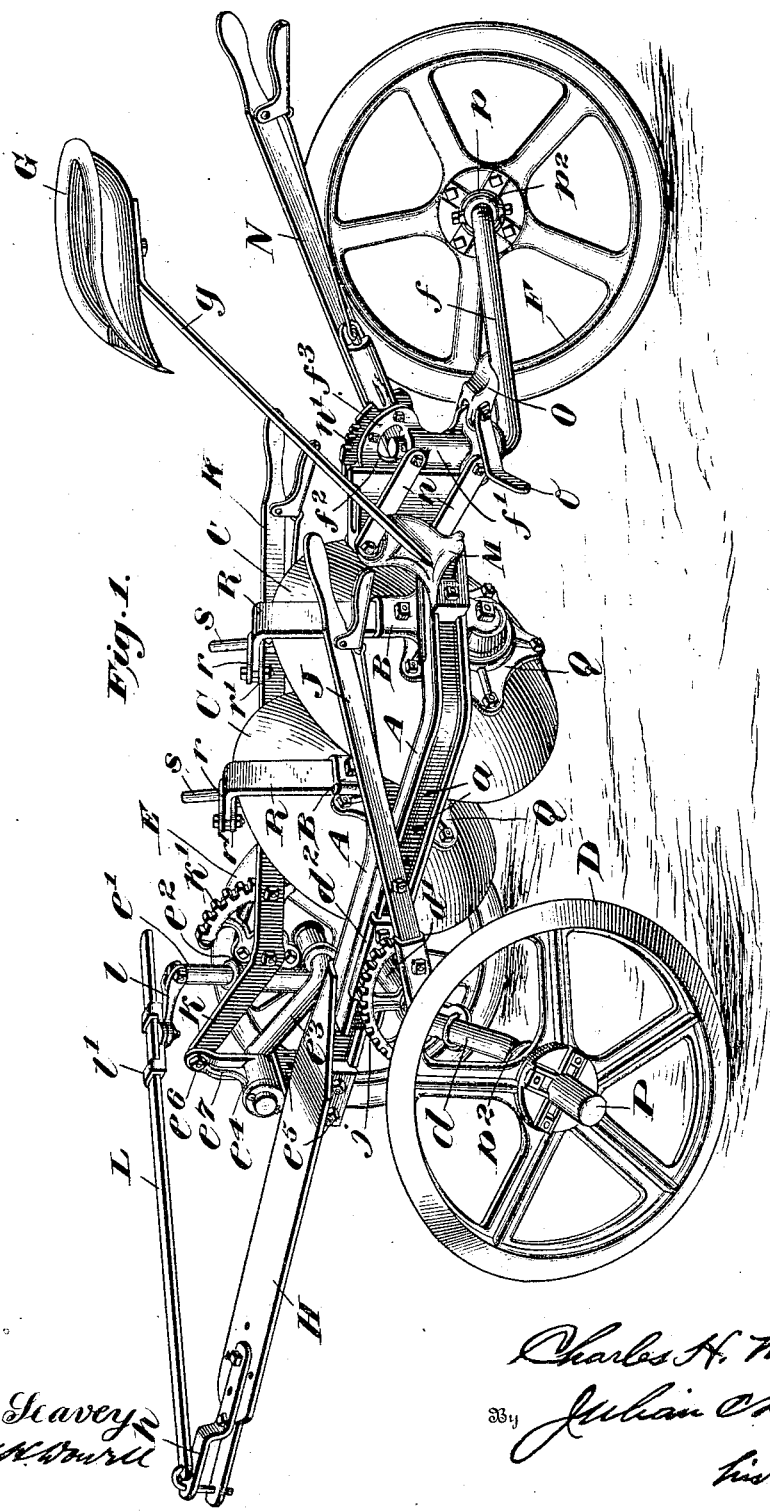

No. 825,145. PATENTED JULY 3, 1906.
C. H. MELVIN.
DISK GANG PLOW.
APPLICATION FILED JULY 31, 1902.
5 SHEETS—SHEET 2.
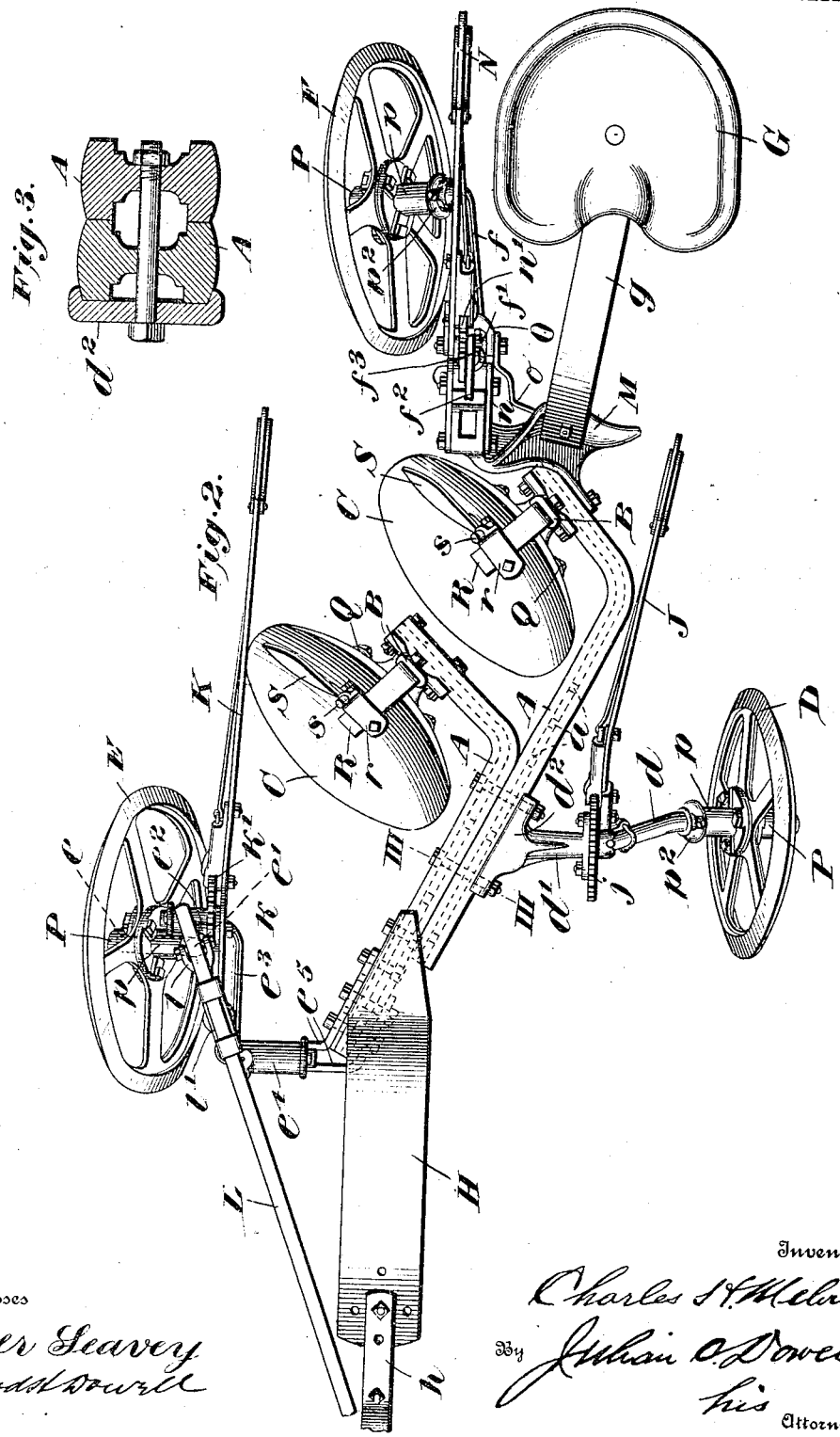
Witnesses
Elmer Leavey
Inventor
Charles H. Melvin
By Julian O. Dowell
his Attorney

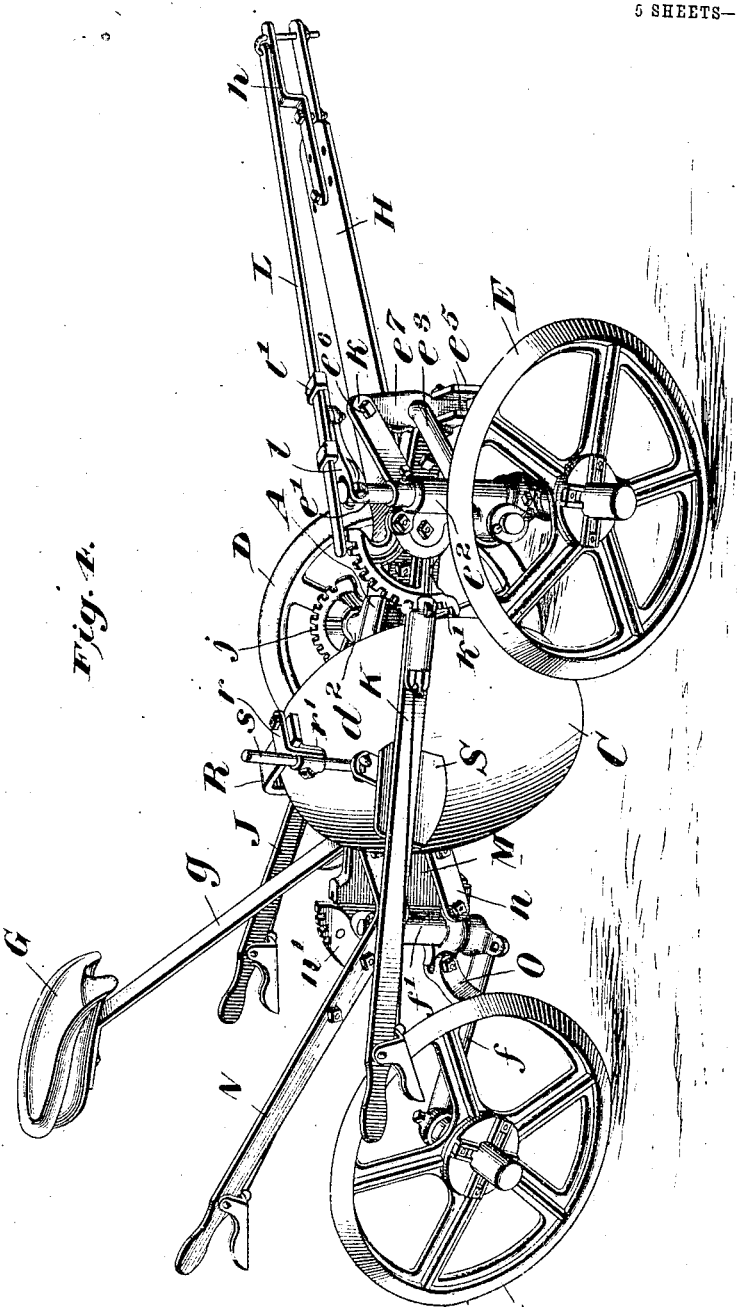

No. 825,145. PATENTED JULY 3, 1906.
C. H. MELVIN.
DISK GANG PLOW.
APPLICATION FILED JULY 31, 1902.

5 SHEETS—SHEET 4.

Witnesses
Elmer Seavey
Inventor
Charles H. Melvin
By Julian C. Dowell
his Attorney No. 825,145. PATENTED JULY 3, 1906.
C. H. MELVIN.
DISK GANG PLOW.
APPLICATION FILED JULY 31, 1902.
5 SHEETS—SHEET 5.
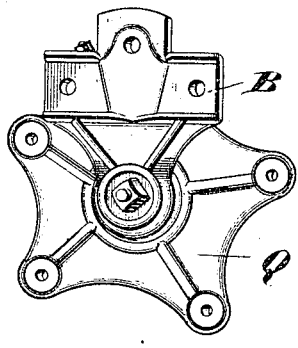
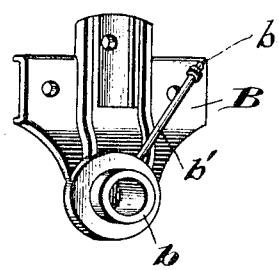
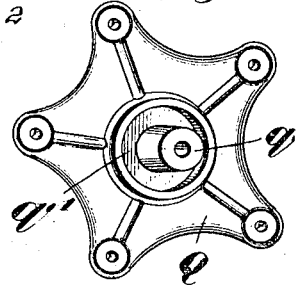
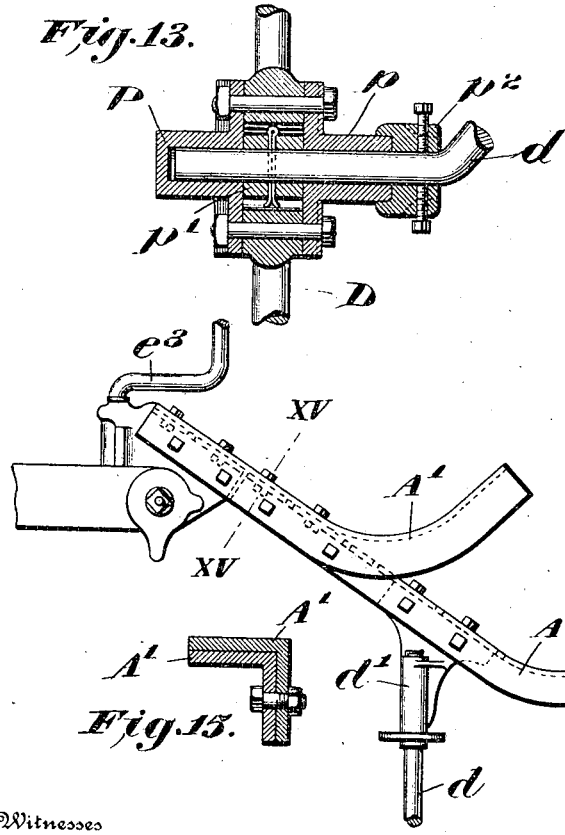
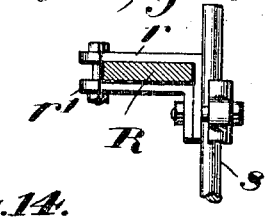
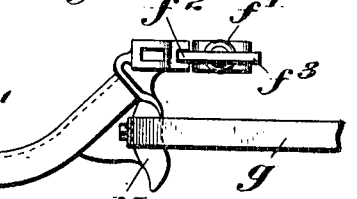
Witnesses
Elmer Seavey
Inventor
Charles H. Melvin
By Julian C. Dowell
his Attorney

UNITED STATES PATENT OFFICE.

CHARLES H. MELVIN, OF MOLINE, ILLINOIS, ASSIGNOR TO DEERE AND COMPANY, OF MOLINE, ILLINOIS, A CORPORATION OF ILLINOIS.

DISK GANG-PLOW.

No. 825,145.  Specification of Letters Patent.  Patented July 3, 1906.

Application filed July 31, 1902. Serial No. 117,873.

*To all whom it may concern:*

Be it known that I, CHARLES H. MELVIN, a citizen of the United States, residing at Moline, in the county of Rock Island and State of Illinois, have invented certain new and useful Improvements in Disk Gang-Plows; and I do hereby declare the following to be a full, clear, and exact description of the invention, such as will enable others skilled in the art to which it appertains to make and use the same.

My invention is designed especially with reference to disk gang-plows, but is also applicable to plows of other types, and hence not limited to the particular embodiment herein illustrated and described.

The principal objects of the invention are, first, to provide a simple and efficient adjustable frame for gang-plows which while supporting the disks or other furrow-turning devices in proper receding order and in suitable relation to the furrow-wheels and line of draft will permit ready adjustment or change of the relative positions of the disks or furrow-openers for regulating the width of furrow or furrows turned between them, this adjustment being accomplished without the aid of separate spreading devices or similar contrivances; second, to render the construction adaptable for ready conversion from a gang-plow into a single plow, or vice versa, simply by omitting or adding one or more parts of the frame and disk or disks supported thereby without altering the position or relation of the remaining disk or disks; third, to provide improved means for adjustment or shifting of the position of the front furrow-wheel for the purpose of regulating the width of furrow cut by the front disk or furrow-opener, also for lateral adjustment of the draft devices, so as to equalize the draft, and for adjustment of the land-wheel, so as to regulate the tread in accordance with the work to be done; fourth, to provide improved means for automatically turning or castering the front furrow-wheel by the draft or pull, also for setting said furrow-wheel at any desired angle to the draft; fifth, to provide a latch device for controlling the rear caster-wheel; sixth, to provide improved means for raising and lowering the wheels with their caster-spindles, so as to shift said spindles by parallel motion; seventh, to produce improved bearings for the disks and also for the wheels of the implement, and, finally, to simplify the construction and arrangement of parts and to improve generally upon implements of this same character.

The invention will hereinafter be first fully described with reference to the accompanying drawings, which form a part of this specification, and then pointed out in the claims following the description.

Figure 6:
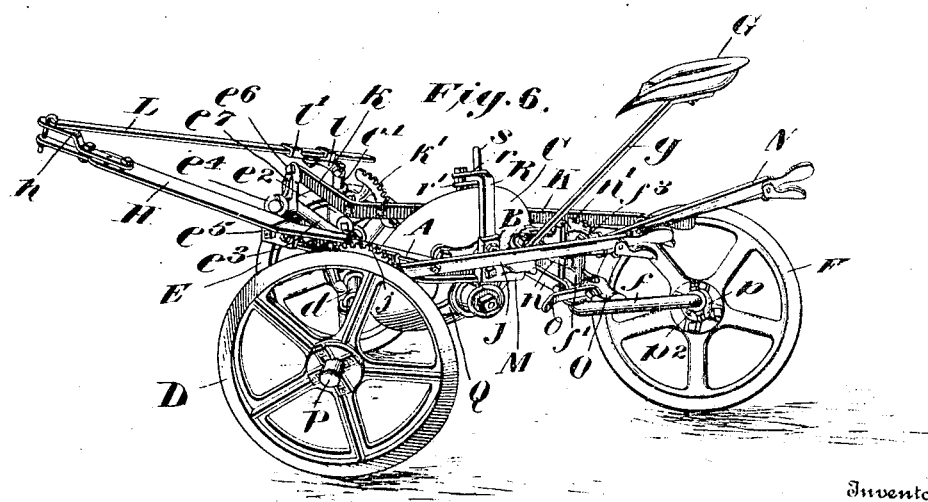

In said drawings, in which corresponding parts in the different views are designated by the same letters of reference, Figure 1 is a perspective view of a disk gang-plow embodying my invention, showing the disks raised in proper position for transportation to and from the field, this view being taken from the landside of the implement. Fig. 2 is a plan view of said disk plow. Fig. 3 is a section through the adjustable frame, taken on line III III of Fig. 2. Fig. 4 is a perspective view showing the implement converted into a single-disk plow, this view being taken from the furrow side. Fig. 5 is a smaller perspective view of the disk gang-plow shown in Fig. 1, taken from the furrow side and showing the disks lowered in position for use. Fig. 6 is a perspective view, similar to Fig. 1, but on a reduced scale, showing the implement converted into a single-disk plow. Figs. 7 and 8 are detail perspective views of the disk standard and bearing, respectively. Fig. 9 is a detail perspective view of the disk bearing and standard secured together. Figs. 10 and 11 are detail views of the two members of a connecting device between the caster-spindle of the front furrow-wheel of the implement and a link attached to the plow-clevis for controlling the castering of said wheel. Fig. 12 is a detail view showing the connection between the shank of one of the disk scrapers and its supporting-standard. Fig. 13 is a cross-section through one of the wheel-hubs. Fig. 14 is a plan view of a plow-frame of modified construction, and Fig. 15 is a section taken on line XV XV of Fig. 14.

My improved gang-plow frame consists, essentially, of two or more beams or frame members adjustably secured lengthwise together or one to another in receding order and arranged diagonally to the line of draft. Each of said adjustable beams or parts of the frame supports one of the disks or other furrow-turning devices of the implement and is preferably formed or provided with a rearward bent arm or angular extension, to which the disk-bearing or plow-standard is attached, the said bearing or standard being thus bolted in such position as not to interfere with the range of adjustability of the several members of the frame.

Referring to the implement illustrated in Figs. 1, 2, and 5, the plow-frame consists of two of such adjustable beams or parts, which are designated by the letters A A. To their rearward-bent arms or angular extensions are bolted or otherwise secured the standards B, which support the furrow-openers or disks C. Said arms are parallel and also diagonally disposed, so that the disks, which are supported or mounted substantially parallel with the arms, are held in proper relation and with their cutting edges disposed at a suitable angle or oblique to the line of draft. The beams are preferably substantially I-shaped in cross-section, as shown in Fig. 3, and their forward main arms or members are provided with corresponding series of bolt-holes $a$, arranged, preferably, at equal distances apart, whereby the beams may be bolted lengthwise together in different positions, so as to support the disks at different distances apart, and thus regulate the width of furrow turned by the rear disk. It will be observed also that adjustment of the beams changes the relative position of the disks both laterally and longitudinally of the line of draft, so that for a narrow furrow the rear disk stands closer behind the front disk, while for a wider furrow said rear disk is moved farther behind said front disk, thus always maintaining a sufficient recedence in order to prevent any crowding of the furrow between the disks. In the construction referred to the said adjustable frame is supported by a land-wheel D, a front furrow-wheel E, and a rear caster-wheel F, which are mounted on crank axles or spindles $d$, $e$, and $f$, respectively. The implement is also provided with a driver's seat G, the seat-spring $g$ of which may be secured to the frame in any suitable manner, and is further provided with a tongue or tongue-plate H and a suitable clevis $h$ at the front end thereof. This tongue-plate is diagonally flanged at its rear end and bolted to the rear side of the front beam or frame member. By unfastening the bolts the tongue-plate may be slid along the beam and secured thereto in different positions, thus adjusting the lateral position of the hitch or draft devices—a feature which is especially advantageous in connection with the capacity of the frame for adjustment of the disks.

The inner end or spindle of the land-wheel crank-axle $d$ is journaled in a tubular bearing $d'$, which is formed integrally with a bracket or plate $d^2$, having flanges or lugs embracing the outer side of the rear beam A and secured thereto by the same bolts which fasten the two beams together. The bracket may, however, be secured to the beam by separate bolts or other means and may also be secured to said beam in different positions, so as to regulate the tread of the land-wheel to correspond with the work to be done. The crank-axle $d$ may be rocked in its bearing to adjust the height of the land-wheel by means of a lever J, rigidly secured to said crank-axle, said lever being provided with the usual locking and unlocking device or handpiece and connected spring-actuated bolt engaging the teeth of a segmental rack $j$, which latter is bolted to the other end of the spindle-bearing or otherwise secured to the casting.

The front furrow-wheel axle $e$ is formed with a vertical spindle $e'$, which is journaled in a corresponding bearing in a casting $e^2$. This casting has also a horizontal bearing, in which is journaled one end or spindle of a crank $e^3$. The other end or spindle of said crank is journaled in a bearing or casting $e^4$, secured to or between the outer bent ends of straps $e^5$, which are bolted to the front beam or member of the plow-frame. Pivoted to the casting $e^2$ is a lifting-lever K, having a short arm $k$, which is parallel with crank $e^3$ and is fulcrumed or pivoted at $e^6$ to an upstanding arm $e^7$ on the bearing $e^4$. The crank $e^3$ and arm $k$ thus constitute parallel-motion links, whereby when the furrow-wheel is raised or lowered by the lever K the spindle $e'$ is moved parallel with itself and always maintained in the same vertical relation to the frame. The lever K is also provided with the usual locking and unlocking device or handpiece and connected spring-actuated bolt engaging a segmental rack $k'$, which latter is rigidly secured to or formed integrally with the casting $e^2$.

The straps $e^5$, which hold the casting $e^4$, with the furrow-wheel and other parts supported thereby, are provided with a number of bolt-holes corresponding with the bolt-holes in the beams A, so as to permit adjustment of said straps on the front beam to change the lateral position of the front furrow-wheel, and thus regulate the width of furrow-cut by the front disk. Usually the bolt-holes in the compound frame or beams and in the straps are so arranged that the gang-plow may be adjusted to turn furrows either eight, ten, or twelve inches in width.

The angle of inclination of the front furrow-wheel with the line of draft is controlled by the draft-clevis by means of a link L, the front end of which is coupled with the clevis or clevis-bolt, while its rear portion is connected with the spindle $e'$ by a suitable connecting device, so that when the plow is at work the wheel is held in line; but when the implement is turned either to the right or left the furrow-wheel is also turned properly around in the same direction. The connecting device between the link and spindle in the construction illustrated (see Figs. 10 and 11) comprises a yoke or stirrup casting $l$, which straddles the upper part of the spindle and is pivotally secured thereto, and a loop or sleeve casting $l'$, through which the link is slidably fitted, said loop-casting being rigidly secured to the free end of the stirrup-casting by a single fastening-bolt. The loop-casting is thus permitted to swing freely in a vertical direction, so that raising and lowering of the furrow-wheel will not cause the link to bind in any way. It will be noted, also, that any vibration of the loop-casting up or down will not be communicated to the wheel, because the link slides freely through its loops and holds the wheel in proper line. The construction of the two castings is such that the fastening-nut may be loosened and the loop-casting turned to give the furrow-wheel any desired set with relation to the line of draft, and the nut may then be tightened again to secure said castings rigidly together, so that this set will remain constant during the operation of the implement. The parts described thus constitute an independent leading device for the front furrow-wheel.

The inner vertical end or spindle of the rear caster-wheel crank-axle $f$ is journaled in a bearing or casting $f'$, having a front vertical rib $f^2$, Figs. 1 and 2, slidably secured in a corresponding slot or groove in a casting M, which is bolted or rigidly secured to the rear beam or frame member. The seat-spring $g$, as shown, is also attached to said casting M. The castings M and $f'$ are connected at each side by a pair of parallel links $n$, pivotally secured at opposite ends to said castings, the upper link at one side being an angular arm of a lifting or operating lever N. Said lever is also provided with the usual handpiece and connected spring-actuated bolt engaging a segmental rack $n'$, which is bolted to a suitable projection $f^3$ at the top of the bearing or casting $f'$. By these means said vertical spindle of the crank-axle $f$ is always moved parallel to itself. In either its extreme upper or lower position the casting $f'$ is held tightly against its companion casting M by the links $n$, thus making a rigid connection. A latch O is pivoted to the rear of the casting $f'$ and engages the crank-axle $f$, and said latch is so constructed as to permit free castering of the rear wheel in one direction, but to prevent castering in the opposite direction. It is also provided with a trip device or treadle $o$, adapted to be worked by the foot of the driver to raise the latch, and thus permit castering in either direction. Thus in a right-hand plow, as illustrated in the present case, when the implement is turned "haw," or to the left, the rear-wheel casters automatically to make the turn; but when the implement is turned "gee," or to the right, the wheel can caster only by pressing the treadle to raise the latch. If the latch is released by the foot when the wheel comes to its regular position, the latch automatically locks the crank-axle in position, preventing castering except in the one direction. In the case of a left-hand plow the arrangement would of course be reversed, the wheel being permitted to caster for a "gee" turn, but prevented from castering on a "haw" turn. Downward movement of the latch may be properly limited by its abutment against the casting or by stops or other suitable means It is apparent that the rear beam or framebar of the implement may be unbolted and removed, and the castings $d'$ and M, which support the land-wheel and rear caster wheel and seat, may then be bolted or secured to the front beam, thus converting the implement into a single plow, such as represented in Fig. 4. By replacing the said rear beam and disk carried thereby the implement may be reconverted into a double plow.

The plow-frame may be formed of any suitable number of said beams or adjustable parts adapted to support a corresponding number of disks or furrow-openers, the beams being adjustably secured lengthwise one to another in successive order to maintain the disks or furrow-opening devices in proper receding relation. Thus by adding a third beam adjustable on the second the implement may be converted into a triple plow. In the case of a multiple-disk plow the casting M, which supports the rear caster-wheel and seat, would be moved back and secured to the rear member of the frame, and the bracket $d'$, which supports the land-wheel, would also be moved back and secured to the last beam of the series, thus always preserving the proper relations of the various parts.

Each wheel of the implement herein shown consists of a main-wheel casting and supplementary outer and inner hub-castings P and $p$, which are bolted to the central portion of the wheel at opposite sides and constitute the entire bearings of the wheel on the axle or spindle. (See Fig. 13.) Within the central opening or hub portion of the wheel-casting is loosely fitted a collar $p$, secured in place by a spring-cotter or other suitable means, said collar serving to hold the wheel in proper place on the spindle. The outer hub-casting P has an outer closed end or tubular bearing portion, and this, together with the central chamber or opening in the wheel proper, forms a dust-proof oil-socket, which when supplied with oil permits the wheel-spindle to be constantly lubricated. To insure further against entrance of dust to the bearings, a dust cap or band $p^2$ is secured on the wheel-spindle, so as to overlap the inner tubular end of the inner hub-casting $p$, this device of course being secured in place before the hub-castings, wheel, and collar are put on the spindle.

The disks illustrated are secured by countersunk bolts to star-shaped concave castings Q, the heads of the bolts being flush with the front surfaces of the disks to render the latter perfectly smooth. Said castings Q are formed at the back with centrally-bored spindles $q$ with surrounding annular recesses $q'$, forming ball-races. The standards B, which support the disks, are formed with tubular bearings $b$, which fit over the spindles $q$ and within the annular recesses $q'$, suitable balls or antifriction devices being interposed, if desired. An oil-tube $b'$ may be inserted into the bearing $b$ to keep the spindle lubricated, said tubes being closed by a suitable cap $b^2$. Each casting Q is secured to its bearing B by means of a single connecting-bolt, which passes through the spindle $q$ and is fastened in place by a nut and washer, as shown in Fig. 9. The head of this bolt fits into a socket in the face of the casting Q entirely behind the disk. This construction dispenses with the usual central bolts inserted through the disks, leaving their faces entirely smooth and offering no obstruction to the free passage of earth.

The disks may be provided with scrapers S, the shanks $s$ of which are secured to the upper horizontal members of flat angle-bars or L-shaped standards R. Said horizontal members project over the upper edges of the disks from the vertical members of said standards, which are bolted to the disk-standards B. The shank of each scraper is secured by a suitable clip to the vertical leg or face of a small angle-plate $r$, as shown more clearly in Fig. 12, the clip which holds the shank being perferably corrugated on its inner surface to prevent the shank from turning. The horizontal leg of said angle-plate rests on top of the bar R, and said angle-plate is supplemented under the bar by a similarly-disposed angle-plate $r'$. The horizontal legs or members of said angle-plates are connected by a vertical bolt, and a horizontal bolt passing through both of their vertical members and through the corrugated clip serves to clamp the shank and at the same time to clamp the angle-plates to the bar R. The shank may of course be supported by other means, if desired. It will be understood that the adjustable frame and disks or furrow-turning devices may be differently mounted or supported or the plow-wheels differently arranged, if desired, and that the invention is capable of embodiment in different constructions and is applicable to implements of other types or with other furrow-turning devices than those herein illustrated.

One modification of the invention is illustrated in Figs. 14 and 15, where the letters A' A' designate the beams or frame-bars consisting of L-shaped or angle beams having their forward main arms or members fitted one within the other and bolted together. In this construction the furrow and land wheels are connected to the angled beam members by suitable castings, retaining the adjustment and capacity for operation possessed by the corresponding parts when the beam members are made of the ordinary rail or I cross-section type.

Having thus fully described my invention, what I claim as new, and desire to secure by Letters Patent of the United States, is—

1. In a gang-plow, a frame having separate furrow-opener-supporting members independently adjustable lengthwise along different lines oblique to the line of draft, whereby the relative positions of the furrow-openers may be changed laterally and longitudinally.

2. In a gang-plow, a compound frame diagonally disposed to the line of draft and comprising separate furrow-opener-supporting members secured lengthwise together and adjustable with relation to each other in the lines of their lengths.

3. In a gang-plow, a frame consisting of separate furrow-opener-supporting beams adjustably secured lengthwise one to another in receding order and disposed diagonally to the line of draft.

4. In a gang-plow, a frame consisting of separate furrow-opener-supporting beams adjustably secured lengthwise together and diagonally disposed to the line of draft, said beams having angular arms extending therefrom to which the furrow-openers are attached.

5. In a gang-plow, a frame consisting of separate furrow-opener-supporting beams adjustably secured lengthwise one to another in receding order and disposed diagonally to the line of draft, said beams having rear angular arms or extensions to which the furrow-opening devices are attached.

6. In a gang-plow, a frame consisting of separate bent or angle-shaped beams, having their main corresponding arms diagonally disposed to the line of draft and adjustably secured together lengthwise in receding order, and having their other arms also diagonally disposed to the line of draft and supporting the furrow-openers.

7. In a gang-plow, a frame consisting of separate furrow-opener-supporting beams arranged diagonally to the line of draft and having their main portions fitted lengthwise one to another and bolted together and provided with corresponding series of bolt-holes to permit lengthwise adjustment of said beams so as to regulate the width of furrow or furrows cut between the furrow-openers.

8. In a convertible plow, separate interchangeable furrow-opener-supporting beams having overlapping portions detachably secured directly together to permit conversion from a gang-plow into a single plow and vice versa.

9. In a plow, a frame consisting of separate furrow-opener-supporting beams arranged diagonally to the line of draft and detachably secured together and lengthwise adjustable one upon another.

10. In a gang-plow, a compound furrow-opener-supporting frame disposed diagonally of the line of draft and composed of interchangeable parallel oblique members adjustably and detachably secured together and supporting wheels and axles therefor all of which are adapted for attachment to any one or more of said parts, permitting conversion from a gang to a single plow and vice versa.

11. In a plow, the combination with a diagonally-disposed furrow-opener-supporting beam, of a front furrow-wheel, a supporting device therefor, and straps holding said device adjustably bolted to opposite sides of said beam.

12. In a plow, the combination of diagonal furrow-opener-carrying beams adjustably secured lengthwise together, and a furrow-wheel-supporting member adjustably secured on the front beam.

13. In a plow, the combination of diagonal furrow-opener-carrying beams bolted lengthwise together, and a furrow-wheel support bolted lengthwise to one of said beams, said beams and furrow-wheel support being provided with corresponding series of bolt-holes to permit lengthwise adjustment.

14. In a plow, the combination with a diagonal furrow-opener-supporting frame, and means for adjustment of the furrow-openers lengthwise of said frame, of a draft device secured to said frame, and means for adjusting the same lengthwise of said frame and thereby altering the lateral position of said device.

15. In a plow, the combination of a pair of diagonally-disposed furrow-opener-supporting beams, a land-wheel-supporting bracket, and fastening-bolts entered through said beams and bracket securing all of said parts together.

16. In a plow, the combination with a furrow-opener-supporting frame, and a laterally-swinging draft device, of a furrow-wheel the axle of which has a vertically-disposed spindle on which said wheel casters, and a link connecting said draft device and spindle to control the castering of the wheel by the draft, said link being slidably coupled to one of said connected parts to compensate for different distances between them due to different angles of the draft device.

17. In a plow, the combination with a furrow-opener-supporting frame, and a laterally-swinging draft device, of a furrow-wheel the axle of which has a vertical spindle on which said wheel casters, a link coupled with said draft device, and a connecting device slidably fitting said link and secured to said spindle to swing in a vertical direction.

18. In a plow, the combination with a furrow-opener-supporting frame, and a laterally-swinging draft device, of a furrow-wheel the axle of which has a vertical spindle on which said wheel casters, a link connecting said draft device and spindle, said link being coupled to said spindle so as to slide transversely thereto, to control the castering of the wheel, and means for setting and securing said spindle in different positions with relation to said link.

19. In a plow, the combination with a furrow-opener-supporting frame, and a laterally-swinging draft device, of a furrow-wheel the axle of which has a vertical spindle on which said wheel casters, a link coupled with said draft device, and a connecting device between said link and spindle comprising a member slidably secured to the link and a member pivotally secured to the spindle, said members being connected by a fastening-bolt adapted to secure them rigidly together in any desired axial relation.

20. In a plow, the combination with a plow-frame, of a supporting-wheel carried by a vertical standard, a lifting-lever therefor pivotally connected to said standard and having a short arm extending beyond its pivot and fulcrumed to the plow-frame, a link parallel with said short arm pivotally connected to the plow-frame and also to said standard, and means for locking said lever in desired position.

21. In a plow, a caster-wheel carried by a vertical spindle, a bearing for said spindle, said bearing having vertical slidable connection with a portion of the plow-frame by a rib on one of said parts engaging a groove in the other part, parallel links connecting said bearing and portion of the frame, and an operating-lever rigid with one of said links.

22. In a plow, the combination with a rear caster-wheel having a crank-axle, of a latch pivoted to move vertically, resting on said crank-axle, having a depending projection engaging said crank-axle at one side to prevent castering of the wheel in one direction, and adapted to be lifted to permit castering in both directions, substantially as described.

23. In a plow, the combination with a caster-wheel, of a pivoted latch resting on the crank-axle thereof and having a depending projection beside said crank-axle adapted to limit castering in one direction, said latch being provided with a foot-piece for tripping the same to permit free castering in both directions.

24. In a gang-plow, the combination with a frame composed of separate beams adjustably secured together, of disks carried by said beams, disk scrapers and supporting-standards therefor mounted on the frame, and means for fastening the shanks of said scrapers to their standards each consisting of a pair of angle-plates, to one of which the shank is secured, said angle-plates being similarly arranged at opposite sides of the standard and having their corresponding members fastened together, thus clamping them to said standard, substantially as described.

25. In a gang-plow, a compound frame comprising separate parallel furrow-opener-supporting members obliquely disposed to the line of draft and separately adjustable in the lines of their lengths.

26. In a gang-plow, a frame having separate furrow-opener-supporting members independently adjustable along different but substantially parallel lines oblique to the line of draft, for changing the relative positions of the furrow-openers both laterally and longitudinally.

27. In a plow, a frame comprising separate interchangeable furrow-opener-supporting beams detachably secured together, and supporting-wheels therefor all of which are capable of attachment both to one of such beams alone or to the frame including a plurality of such beams, permitting conversion from a gang to a single plow and vice versa.

28. In a plow, a frame comprising separate interchangeable furrow-opener-supporting beams disposed obliquely to the line of draft and having overlapping portions detachably secured directly together.

29. In a wheeled plow, the combination of a supporting-wheel having an axle mounted for lateral angular movement and provided with a vertical arm, a lever to raise and lower said wheel and axle, a laterally angularly movable draft device and a connection between the said draft device and the vertical arm of said axle, to move the latter angularly in unison with said draft device, said connection comprising slidably-related elements free to move with respect to each other, said connection being thereby rendered longitudinally extensible to automatically compensate for the vertical movement of the wheel and axle.

30. In a wheeled plow, the combination of a supporting-wheel having an axle mounted for lateral angular movement and provided with a vertical arm, a lever to raise and lower said wheel and axle, a laterally angularly movable draft device, and a connection including a freely longitudinally extensible element, between the said draft device and the vertical arm of said axle, to move the latter angularly in unison with said draft device and automatically compensate for the vertical movement of the axle and wheel.

31. In a wheeled plow, the combination of a frame, a supporting-wheel having its axle mounted for castering, a laterally movable or swinging draft device, and a connection between said draft device and axle to move the latter angularly in unison with said draft device, said connection comprising slidably-related elements free to move with respect to each other rendering said connection longitudinally extensible.

32. In a wheeled plow, the combination of a frame, a supporting-wheel having its axle mounted for castering, a laterally movable or swinging draft device, and a freely longitudinally extensible connection between said draft device and axle to move the wheel angularly in unison with said draft device and automatically compensate for relative vertical movement between the draft device and wheel.

33. A frame for a gang-plow having, in combination, a plurality of elongated beams having portions thereof arranged substantially parallel and extending diagonally of the line of draft and connected together and adjustable along the lines of their lengths, and having angular extensions for attachment of furrow-openers.

34. A frame for gang-plows comprising a plurality of beams having rigidly-connected portions arranged longitudinally of a line oblique to the line of draft and adjustable lengthwise in such oblique direction and having angular extensions or portions for attachment of furrow-openers.

35. In a plow, the combination of a diagonal furrow-opener-supporting frame, and means for adjustment of the furrow-openers lengthwise thereof, a draft-tongue rigidly attached to said frame, and means for adjusting the attachment of said tongue lengthwise of said frame and thereby altering the lateral position of said tongue.

36. In a plow, the combination with a plow-frame, of a vertically-movable standard and a supporting-wheel carried thereby, parallel links pivotally connecting the frame and standard, a lifting-lever extending from one link and unitary therewith, the pivotal connection between said lever and the standard being between the handle of the lever and its fulcrum on the plow-frame, a segmental rack attached to the standard, and a coacting locking-bolt and retracting device therefor carried by said lever.

In testimony whereof I affix my signature in presence of two witnesses.

CHARLES H. MELVIN.

Witnesses:
CHARLES H. POPE,
PETER C. SIMMON.